United States Patent
Xie et al.

(10) Patent No.: US 12,210,871 B2
(45) Date of Patent: Jan. 28, 2025

(54) MODEL PROCESSING METHOD AND APPARATUS

(71) Applicant: Huawei Technologies Co., Ltd., Shenzhen (CN)

(72) Inventors: Wenlong Xie, Hangzhou (CN); Linmu Wang, Nanjing (CN); Xiaopeng Du, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 43 days.

(21) Appl. No.: 18/344,367

(22) Filed: Jun. 29, 2023

(65) Prior Publication Data

US 2023/0342147 A1 Oct. 26, 2023

Related U.S. Application Data

(63) Continuation of application No. PCT/CN2020/142403, filed on Dec. 31, 2020.

(51) Int. Cl.
*G06F 9/30* (2018.01)

(52) U.S. Cl.
CPC ...... *G06F 9/30025* (2013.01); *G06F 9/30036* (2013.01)

(58) Field of Classification Search
None
See application file for complete search history.

(56) References Cited

U.S. PATENT DOCUMENTS

| | | | |
|---|---|---|---|
| 9,846,724 B2* | 12/2017 | Weyerhaeuser | G06F 16/24542 |
| 10,318,474 B1* | 6/2019 | Krasner | G06F 13/1663 |
| 2016/0283245 A1* | 9/2016 | Ben-Kiki | G06F 9/30087 |
| 2016/0306857 A1* | 10/2016 | Barsness | G06F 16/9024 |
| 2017/0068571 A1* | 3/2017 | Lu | G06F 9/5016 |
| 2017/0147353 A1* | 5/2017 | Shifer | G06F 15/8007 |
| 2017/0262291 A1* | 9/2017 | Lai | G06F 9/50 |
| 2020/0133854 A1* | 4/2020 | Yang | G06F 17/16 |
| 2020/0193343 A1* | 6/2020 | Handa | G06F 5/00 |

* cited by examiner

*Primary Examiner* — Eric Coleman
(74) *Attorney, Agent, or Firm* — Slater Matsil, LLP

(57) ABSTRACT

A method includes: adding a first conversion operator to the model, to convert data input into the first conversion operator into a general format, where the general format is a data format supported by all the plurality of calculation circuits; and modifying another operator that is in the model and that is after the first conversion operator, to cause formats of both input data and output data of the another operator to be the general format.

20 Claims, 10 Drawing Sheets

MODEL PROCESSING METHOD AND APPARATUS

CROSS-REFERENCE TO RELATED APPLICATIONS

This application is a continuation of International Application No. PCT/CN2020/142403, filed on Dec. 31, 2020, the disclosure of which is hereby incorporated by reference in its entirety.

TECHNICAL FIELD

This application relates to the field of artificial intelligence technologies, and specifically, to a model processing method and apparatus.

BACKGROUND

Artificial intelligence (AI) is a theory, a method, a technology, or an application system that simulates, extends, and expands human intelligence by using a digital computer or a machine controlled by a digital computer, to perceive an environment, obtain knowledge, and achieve an optimal result based on the knowledge. In other words, the artificial intelligence is a branch of computer science. The artificial intelligence aims to understand essence of intelligence and enable a machine to have functions of sensing, inference, and decision-making.

In the field of artificial intelligence technologies, training and use of an AI model may be performed on a processor such as a central processing unit (CPU), a graphics processing unit (GPU), or a neural-network processing unit (NPU). These processors may include a plurality of heterogeneous calculation units. For example, the NPU may include two heterogeneous calculation units: a cube unit and a vector unit. Different calculation units include different instruction sets. For example, the Cube unit includes a Cube instruction set, and the Vector unit includes a Vector instruction set. When the AI model is trained or a trained AI model is used for prediction, different heterogeneous calculation units in the NPU may be sequentially used to process to-be-processed data. Because the different calculation units correspond to different data formats, data format conversion needs to be performed on the to-be-processed data a plurality of times. Generally, a data amount of the to-be-processed data is large, and performing data format conversion on the to-be-processed data increases a computation amount, and reduces a training or prediction speed of the AI model.

SUMMARY

Embodiments of the present application provide a model processing method and apparatus, to reduce data format conversion operations in a process of running a model by using a plurality of heterogeneous calculation units, and improve running efficiency of the model.

A first aspect of this application provides a model processing method, where a model includes a plurality of operators, the plurality of operators run on a plurality of calculation units, the plurality of calculation units correspond to different data formats, and the method includes: adding a first conversion operator to the model, to convert data input into the first conversion operator into a general format, where the general format is a data format supported by all the plurality of calculation units; and modifying another operator that is in the model and that is after the first conversion operator, to cause formats of both input data and output data of the another operator to be the general format.

The operator includes an operator such as an adding operator (ADD), a multiplicating operator (MUL), an absolute value operator (ABS), a matrix multiplication operator (MatMul), a convolution operator (ConV), a deconvolution operator ( ), a fully connecting operator (FC), a rectified linear unit (RELU) activation operator, or the like.

The modifying an operator that is in the model and that is after the first conversion operator specifically includes: modifying declarations of the input data and the output data in the operator. For example, an initial format of the input data in the operator is a format 1. To adapt to the input data in the general format, the declaration of the input data in the operator may be modified to the general format (for example, formatGeneral).

The modifying an operator that is in the model and that is after the first conversion operator further specifically includes: modifying a storage address that is included in the operator and that is used to store operator input data, intermediate data in an operator processing process, or operator output data.

The modifying an operator that is in the model and that is after the first conversion operator further specifically includes: modifying a format of a parameter in the operator, to support processing of data in the general format.

A unified general format is set relative to a plurality of calculation units or a plurality of calculation circuits, and the operator of the model is modified to support the general format, so that a format conversion operation of to-be-processed data may be reduced in a model running process. This improves running efficiency of the model. It should be understood that in the conventional technology, formats of data that may be processed by a heterogeneous calculation circuit are different. Embodiments of this application provide a general format, and different calculation circuits may process data having the general format. In embodiments of this application, a first conversion operator is added to an input end close to the model, data of an input model is converted into the general format, and another operator that is after the first conversion operator is modified, to cause formats of both the input data and the output data of the another operator to be the general format. In this way, when switching is performed between heterogeneous calculation circuits in the model running process, format conversion does not need to be frequently performed on the to-be-processed data. This improves running efficiency of the model.

In a possible implementation of the first aspect of this application, the method further includes: receiving input data of the model, and after modifying an operator that is in the model and that is after the first conversion operator, running, by the plurality of calculation units, a corresponding operator in the model based on the input data of the model, to train the model or obtain output data of the model.

In a possible implementation of the first aspect of this application, the plurality of calculation units include a plurality of calculation units in a single processor, or a plurality of calculation units in a plurality of processors.

In a possible implementation of the first aspect of this application, the plurality of calculation units include at least two calculation units in an NPU or at least two calculation units in a GPU.

The general format is set relative to a single processor, so that format conversion operations may be reduced when the processor is used in the model running process. The general format is set relative to a plurality of processors, so that a format conversion operation inside the processor and a format conversion operation between processors may be reduced in the model running process.

In a possible implementation of the first aspect of this application, different data formats correspond to different dimensions, and a dimension of the general format is greater than or equal to a maximum dimension in the different data formats.

The dimension of the general format is set to be greater than or equal to the maximum dimension in the different data formats, so that conversion from each data format to the general format is facilitated, and the method in embodiments of the present application is applicable to model processing of data in various formats.

In a possible implementation of the first aspect of this application, after receiving the input data of the model, different formats corresponding to the plurality of calculation units are determined based on a calculation unit corresponding to each operator, and the general format is determined based on the different formats corresponding to the plurality of calculation units. In an implementation, a calculation unit corresponding to each operator may be further determined through a calculation flow graph, to determine a format corresponding to the operator. The format of the operator is determined based on the calculation flow graph. This simplifies a determining process and improves processing efficiency of the model.

In a possible implementation of the first aspect of this application, the adding a first conversion operator to the model includes: determining, based on the model and the input data of the model, a location for adding the first conversion operator to the model. It may be understood that in embodiments of this application, a location of the first conversion operator in the model is not limited to being determined based on the model and the input data of the model. For example, the first conversion operator may be added to the input end of the model, to convert a format of the input data input into the model into the general format, or the first conversion operator may be added after an operator at a middle location of the model, to convert a format of the output data of the operator at the middle location into the general format. In an implementation, the first conversion operator may be disposed at interaction between different calculation units (or calculation circuits) based on a calculation flow graph of the model, to convert data output by a previous calculation circuit into data in the general format and then input the converted data into a next calculation circuit.

In a possible implementation of the first aspect of this application, after receiving the model and input data of the model, a calculation flow graph of the model is generated based on the model and the input data of the model, where the calculation flow graph includes the plurality of operators and a plurality of conversion operators between the plurality of operators, and the adding a first conversion operator to the model includes: replacing the $1^{st}$ conversion operator in the plurality of conversion operators with the first conversion operator; and after the modifying an operator that is in the model and that is after the first conversion operator, the method further includes: updating the calculation flow graph. The calculation flow graph is generated based on the modified operator, so that the model may be run based on the calculation flow graph. This reduces a format conversion operation in the model running process, and improves the running efficiency of the model.

In a possible implementation of the first aspect of this application, a second conversion operator is added at an end of the model, to cause the output data of the model to have a predetermined format. The predetermined format is determined based on a data format required by a receiving end of the output data of the model. For example, after calculating the output data of the model, the NPU inputs the output data of the model into the CPU, to provide the output data of the model for a user, and the CPU processes data, for example, in an ND format. Therefore, the NPU converts data in an NZ format into the data in the ND format by running the second conversion operator, to input the data into the CPU.

In a possible implementation of the first aspect of this application, the plurality of calculation units include a matrix calculation unit and a vector calculation unit that are in the NPU, the general format is a first format corresponding to the matrix calculation unit, and the modifying an operator that is in the model and that is after the first conversion operator includes: modifying an operator that is in the model, that is after the first conversion operator, and that runs on the vector calculation unit.

In a possible implementation of the first aspect of this application, the plurality of calculation units include a convolution calculation unit and a tensor calculation unit in the GPU, the general format is a second format corresponding to the convolution calculation unit, and the modifying an operator that is in the model and that is after the first conversion operator includes: modifying an operator that is in the model, that is after the first conversion operator, and that runs on the tensor calculation unit.

In a possible implementation of the first aspect of this application, the model is a neural network model.

A second aspect of this application provides a model processing apparatus, including a processor and a plurality of calculation units, where a model includes a plurality of operators, the plurality of operators run on the plurality of calculation units, the plurality of calculation units correspond to different data formats, and the processor is configured to: add a first conversion operator to the model, to convert data input into the first conversion operator into a general format, where the general format is a data format supported by all the plurality of calculation units; and modify another operator that is in the model and that is after the first conversion operator, to cause formats of both input data and output data of the another operator to be the general format.

In a possible implementation of the second aspect of this application, the processor is further configured to: receive input data of the model; and after the modifying an operator that is in the model and that is after the first conversion operator, invoke the plurality of calculation units to respectively run corresponding operators in the model to process the input data, to train the model or obtain output data of the model.

In a possible implementation of the second aspect of this application, the processor is further configured to: after the receiving input data of the model, determine, based on a calculation unit corresponding to each operator, different formats corresponding to the plurality of calculation units, and determine the general format based on the different formats corresponding to the calculation units.

In a possible implementation of the second aspect of this application, that the processor is configured to add a first conversion operator to the model includes: The processor is specifically configured to determine, based on the model and the input data of the model, a location for adding the first conversion operator to the model.

In a possible implementation of the second aspect of this application, the processor is further configured to: after receiving the model and input data of the model, generate a calculation flow graph of the model based on the model and the input data of the model, where the calculation flow graph includes the plurality of operators and a plurality of conversion operators between the plurality of operators, and that the processor is configured to add a first conversion operator to the model includes: The processor is specifically configured to replace the $1^{st}$ conversion operator in the plurality of conversion operators with the first conversion operator; and the processor is further configured to update the calculation flow graph after the modifying an operator that is in the model and that is after the first conversion operator.

In a possible implementation of the second aspect of this application, the processor is further configured to add a second conversion operator to an end of the model, to cause the output data of the model to have a predetermined format.

In a possible implementation of the second aspect of this application, the plurality of calculation units include a matrix calculation unit and a vector calculation unit in a neural-network processing unit NPU, the general format is a first format corresponding to the matrix calculation unit, and that the processor is configured to modify an operator that is in the model and that is after the first conversion operator includes: The processor is specifically configured to modify an operator that is in the model, that is after the first conversion operator, and that runs on the vector calculation unit.

In a possible implementation of the second aspect of this application, the plurality of heterogeneous calculation units include a convolution calculation unit and a tensor calculation unit in the GPU, the general format is a second format corresponding to the convolution calculation unit, and that the processor is configured to modify an operator that is in the model and that is after the first conversion operator includes: The processor is specifically configured to modify an operator that is in the model, that is after the first conversion operator, and that runs on the tensor calculation unit.

A third aspect of this application provides a model processing apparatus, where the model includes a plurality of operators, the plurality of operators run on a plurality of calculation circuits, the plurality of calculation circuits correspond to different data formats, and the apparatus includes: an adding unit, configured to add a first conversion operator to the model, to convert data input into the first conversion operator into a general format, where the general format is a data format supported by all the plurality of calculation circuits; and a modification unit, configured to modify another operator that is in the model and that is after the first conversion operator, to cause formats of both input data and output data of the another operator to be the general format.

In a possible implementation of the third aspect of this application, the apparatus further includes: a receiving unit, configured to receive input data of the model, and an invoking unit, configured to: after the modifying an operator that is in the model and that is after the first conversion operator, invoke the plurality of calculation circuits to run corresponding operators in the model to process the input data, to train the model or obtain output data of the model.

In a possible implementation of the third aspect of this application, the apparatus further includes: a determining unit, configured to: after the receiving input data of the model, determine, based on a calculation circuit corresponding to each operator, different data formats corresponding to the plurality of calculation circuits, and determine the general format based on the different data formats corresponding to the plurality of calculation circuits.

In a possible implementation of the third aspect of this application, the adding unit is specifically configured to determine, based on the model and the input data of the model, a location for adding the first conversion operator to the model.

In a possible implementation of the third aspect of this application, the apparatus further includes: a generation unit, configured to: after the receiving input data of the model, generate a calculation flow graph of the model based on the model and the input data of the model, where the calculation flow graph includes the plurality of operators and a plurality of conversion operators between the plurality of operators, and the adding unit is specifically configured to replace the $1^{st}$ conversion operator in the plurality of conversion operators with the first conversion operator; and the apparatus further includes: an update unit, configured to update the calculation flow graph after the modifying an operator that is in the model and that is after the first conversion operator.

In a possible implementation of the third aspect of this application, the adding unit is further configured to add a second conversion operator before an output end of the model, to cause the output data of the model to have a predetermined format.

In a possible implementation of the third aspect of this application, the plurality of calculation circuits include a matrix calculation circuit and a vector calculation circuit in the NPU, the general format is a first format corresponding to the matrix calculation circuit, and the modification unit is specifically configured to modify an operator that is in the model, that is after the first conversion operator, and that runs on the vector calculation circuit.

In a possible implementation of the third aspect of this application, the plurality of calculation circuits include a convolution calculation circuit and a tensor calculation circuit that are in the GPU, the general format is a second format corresponding to the convolution calculation circuit, and the modification unit is specifically configured to modify an operator that is in the model, that is after the first conversion operator, and that runs on the tensor calculation circuit.

A fourth aspect of this application provides a computer-readable storage medium, storing a computer program, where when the computer program is executed in a calculation device, the calculation device is enabled to perform the method according to the first aspect of this application.

A fifth aspect of this application provides a calculation device, including a memory and a processor, where the memory stores executable code; and when executing the executable code, the processor implements the method according to the first aspect of this application.

A sixth aspect of this application provides a computer program product, where when the computer program product is run on a calculation device, the calculation device is enabled to perform the method according to the first aspect of this application.

BRIEF DESCRIPTION OF THE DRAWINGS

To describe the technical solutions in embodiments of the present application or in the conventional technology more clearly, the following briefly describes the accompanying drawings for describing embodiments or the conventional technology. It is clear that the accompanying drawings in the following description show merely some embodiments of the present application, and a person of ordinary skill in the art may still derive other drawings from these accompanying drawings without creative efforts.

DETAILED DESCRIPTION OF ILLUSTRATIVE EMBODIMENTS

The following describes the technical solutions in embodiments of the present application with reference to the accompanying drawings in embodiments of the present application. It is clear that the described embodiments are merely a part rather than all of embodiments of the present application. All other embodiments obtained by a person of ordinary skill in the art based on embodiments of the present application without creative efforts shall fall within the protection scope of the present application.

Figure 1:
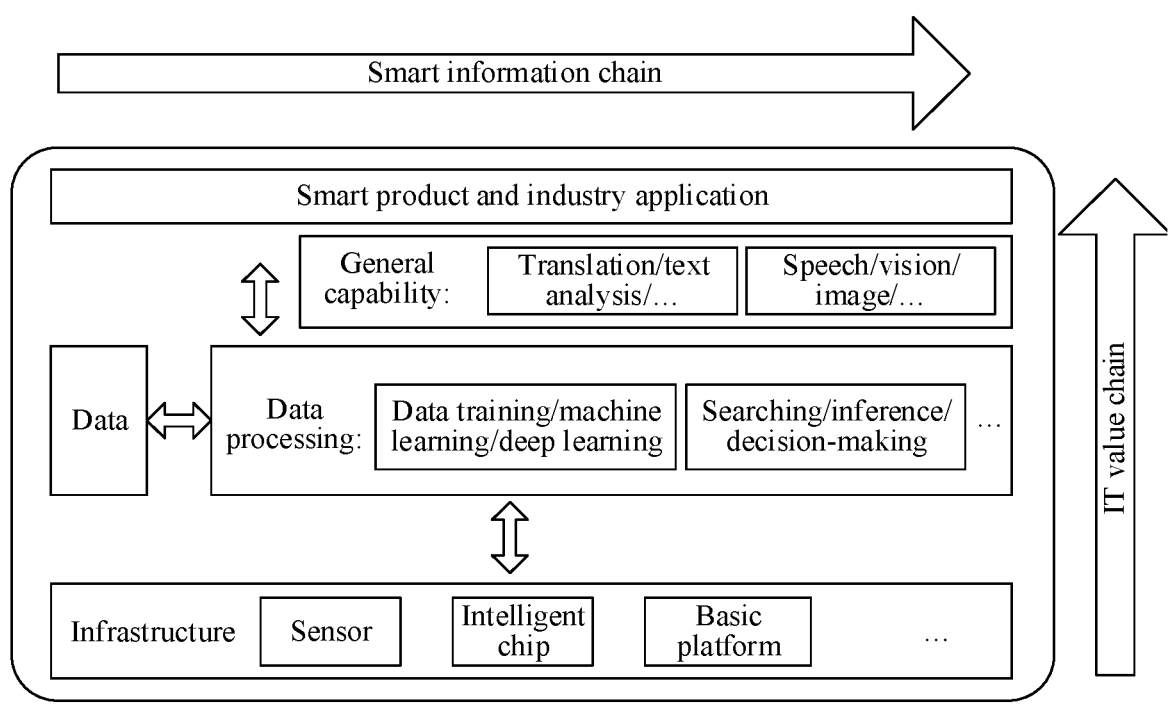
FIG. 1 is a schematic diagram of an artificial intelligence main framework according to an embodiment of the present application.

FIG. 1 is a schematic diagram of an artificial intelligence main framework. The main framework describes an overall working procedure of an artificial intelligence system, and is applicable to a requirement of a general artificial intelligence field.

The following describes the artificial intelligence main framework from two dimensions: an "intelligent information chain" (a horizontal axis) and an "IT value chain" (a vertical axis).

The "intelligent information chain" reflects a series of processes from obtaining data to processing the data. For example, the process may be a general process including intelligent information perception, intelligent information representation and formation, intelligent inference, intelligent decision-making, and intelligent execution and output. In this process, the data undergoes a refinement process of "data-information-knowledge-intelligence".

The "IT value chain" from an underlying infrastructure and information (which provides and processes technology implementations) of artificial intelligence to an industrial ecology process of the system reflects values brought by artificial intelligence to the information technology industry.

The artificial intelligence framework includes the following main components.

(1) Infrastructure

The infrastructure provides calculation capability support for the artificial intelligence system, implements communication with the external world, and implements support through basic platforms. The infrastructure includes: a sensor, configured to communicate with the outside; an intelligent chip (a hardware acceleration chip such as a CPU, an NPU, a GPU, an application-specific integrated circuit (ASIC), or a field programmable gate array (FPGA)), configured to provide a calculation capability; and a basic platform, including platform assurance and support related to a distributed calculation framework and a network, and may include cloud storage and calculation, an interconnection network, and the like. For example, the sensor communicates with the outside to obtain data, and the data is provided to a smart chip for calculation, where the smart chip is in a distributed calculation system provided by the basic platform.

(2) Data

Data at an upper layer of the infrastructure indicates a data source in the field of artificial intelligence. The data relates to a graph, an image, speech, and text; and further relates to internet of things data of a conventional device. The internet of things data of the conventional device includes service data of an existing system, and perception data such as force, displacement, a liquid level, a temperature, and humidity.

(3) Data Processing

Data processing usually includes a manner such as data training, machine learning, deep learning, searching, inference, or decision-making.

Machine learning and deep learning may be used to perform symbolic and formal intelligent information modeling, extraction, preprocessing, training, and the like on data.

Inference is a process of simulating a human intelligent inference manner and performing machine thinking and problem resolving with formal information based on an inference control policy in a computer or an intelligent system. A typical function is searching and matching.

Decision-making is a process of making a decision after intelligent information is inferred, and usually provides functions such as classification, ranking, and prediction.

(4) General Capability

After data processing mentioned above is performed on data, some general capabilities may be further formed based on a data processing result. The general capabilities may be algorithms or general systems, for example, translation, text analysis, computer vision processing, speech recognition, and image recognition.

(5) Smart Product and Industry Application

The smart product and the industry application are a product and an application of the artificial intelligence system in various fields, and are package of an overall solution of the artificial intelligence, so that decision-making for intelligent information is productized and an application is implemented. Application fields mainly include: smart manufacturing, smart transportation, smart home, smart health care, smart security protection, autonomous driving, a safe city, a smart terminal, and the like.

Figure 2:
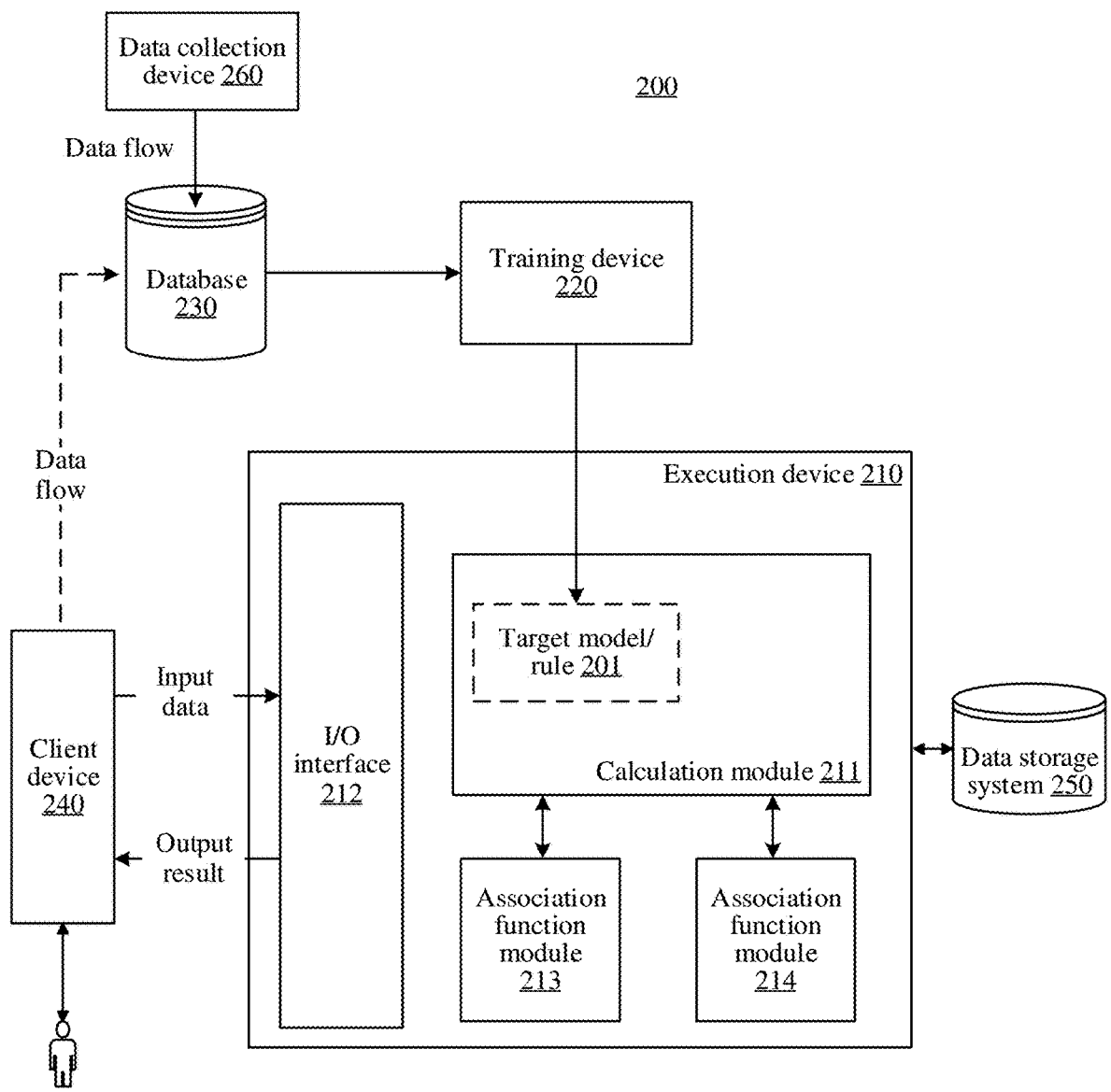
FIG. 2 is a schematic diagram of a system architecture according to an embodiment of the present application.

Refer to FIG. 2. Embodiments of the present application provide a system architecture 200. A data collection device 260 is configured to collect AI model sample data and store the AI model sample data into a database 230. A training device 220 generates a target model/rule 201 based on sample data maintained in the database 230.

The AI model includes, for example, a neural network model.

The neural network model is a network structure that simulates behavioral characteristics of an animal neural network for information processing, and is also referred to as an artificial neural network (ANN) for short. The neural network model includes, for example, at least one of a plurality of neural network models such as a convolutional neural network (CNN), a deep neural network model (DNN), and a recurrent neural network (RNN). A structure of the neural network model includes a large quantity of nodes (or referred to as neurons) connected to each other, and an objective of information processing is achieved by learning and training input information based on a specific computation model. A neural network model includes an input layer, a hidden layer, and an output layer. The input layer is responsible for receiving an input signal. The output layer is responsible for outputting a calculation result of the neural network. The hidden layer is responsible for calculation processes such as learning and training, and is a memory unit of the network. A memory function of the hidden layer is represented by a weight matrix. Generally, each neuron corresponds to a weight coefficient.

Work of each layer in the neural network model may be described by using a mathematical expression (or a function) $y=a(W\vec{x}+b)$, where z is an input vector of the layer, y is an output value (or an output vector) of the layer, and a, W, and b are model parameters included at the layer. An input vector of the input layer of the model is an input feature vector of the model, and each element in the input feature vector is a feature value of a to-be-predicted object. An output value output by the output layer of the model is a predicted value of the model, and the predicted value indicates a prediction result of the to-be-predicted object. From a physical perspective, work of each layer in the neural network model may be understood as completing transformation from input space to output space by performing five operations on the input space (a set of input vectors). The five operations include: 1. dimension increase/dimension reduction; 2. zoom in/out; 3. rotation; 4. translation; and 5. "bending". The operations 1, 2, and 3 are performed by $W\vec{x}$, the operation 4 is performed by +b, and the operation 5 is performed by a( ). The word "space" is used herein for expression because a classified object is not a single thing, but a type of things. Space is a collection of all individuals of such type of things. The space refers to a set of all individuals of this type of object. W is a weight vector, and each value in the vector represents a weight value of a neuron in the neural network at the layer. The vector W determines space transformation from the input space to the output space described above. In other words, a weight W at each layer controls how to transform space. An objective of training the neural network model is to finally obtain a weight matrix (a weight matrix formed by vectors W at a plurality of layers) of all layers of a trained neural network. Therefore, the training process of the neural network is essentially a manner of learning control of space transformation, and more specifically, learning a weight matrix.

In a process of training the neural network model, the training device 220 may compare a predicted value of a current network with an expected target value, and update a weight vector of each layer of the neural network based on a difference between the two values, so that an output of the neural network model is as close as possible to a value that is expected to be predicted. For example, if the predicted value of the neural network model is greater than the target value, a weight vector of the model is adjusted to reduce the predicted value of the model, and vice versa. In this way, adjustment is continuously performed until the target model/rule 201 that can predict a desired target value (namely, a real value or a label value) is obtained. To this end, a loss function or an objective function may be predefined, which are important equations for measuring a difference between the predicted value and the target value. The loss function is used as an example. A higher output value (loss) of the loss function indicates a larger difference. Therefore, training of the neural network model is a process of minimizing the loss as much as possible.

The target model/rule 201 obtained by the training device 220 may be applied to different systems or devices. In FIG. 2, an I/O interface 212 is configured for an execution device 210, to exchange data with an external device. A "user" may input data to the I/O interface 212 through a client device 240.

The execution device 210 may invoke data, code, and the like in a data storage system 250, and may further store, in the data storage system 250, data, instructions, and the like.

A calculation module 211 processes input data by using the target model/rule 201, to output a processing result. Finally, the I/O interface 212 returns the processing result to the client device 240, and provides the processing result to the user. The execution device 210 may further include an association function module (the association function module 213 and the association function module 214 are shown in FIG. 2), and the association function module may perform association processing based on a processing result of the calculation module 211, to output a result associated with the processing result.

More deeply, the training device 220 may generate, for different targets, corresponding target models/rules 201 based on different data, to provide a better result for the user.

In a case shown in FIG. 2, the user may manually specify data to be input into the execution device 210, for example, may perform an operation on an interface provided by the I/O interface 212. In another case, the client device 240 may automatically input data to the I/O interface 212 and obtain a result. If the client device 240 needs to obtain permission of the user for automatically inputting the data, the user may set corresponding permission on the client device 240. The user can view, on the client device 240, a result output by the execution device 210. The result may be specifically presented in a specific manner, for example, display, sound, or an action. The client device 240 may also serve as a data collection end to store the collected sample data in the database 230.

It should be noted that FIG. 2 is merely a schematic diagram of a system architecture according to an embodiment of the present application. A location relationship between devices, components, modules, and the like shown in the figure does not constitute any limitation. For example, in FIG. 2, the data storage system 250 is an external storage device relative to the execution device 210, and in another case, the data storage system 250 may alternatively be disposed in the execution device 210. In addition, the training device 220 and the execution device 210 may be a same calculation device. For example, the training device 220 is a platform server. After training the target model 201, the platform server serves as the execution device 210 to provide a service processing service for the user.

In the execution device 210 or the training device 220, a neural network (neural network, NN) model may be run through a processor such as a CPU, a GPU, or an NPU, to implement a plurality of functions such as object detection, image processing, video processing, natural language processing, and recommendation. The CPU is a computation and control core of the execution device, and controls and allocates all hardware resources (including the GPU and the NPU) of the execution device. The GPU is a microprocessor for image processing, and is configured to perform mathematical and geometric calculation, to provide a function such as graphics rendering. The NPU is suitable for performing artificial intelligence (AI) processing on data such as an image and a video based on the neural network. This may greatly improve computation efficiency of the neural network.

It should be understood that a calculation unit that has different structures is referred to as a heterogeneous calculation unit. The foregoing processors may include a heterogeneous calculation unit architecture, to be specific, a chip of the processor includes at least two calculation units having different structures. The calculation unit is, for example, a calculation circuit in the processor. The two calculation units having different structures are two hardware units corresponding to different instruction sets, and the hardware unit may also be referred to as a core. For example, the CPU may include two hardware units respectively corresponding to a streaming SIMD extension (SSE) instruction set and a general-purpose instruction set. The GPU may include a Cuda core and a Tensor core. The Cuda core corresponds to a Cuda instruction set and is used to perform calculation such as convolution calculation. The Tensor core corresponds to a Tensor instruction set and is used to perform tensor calculation. The NPU may include a Cube unit corresponding to a Cube instruction set and a Vector unit corresponding to a Vector instruction set, where the Cube instruction set is used to perform matrix calculation, and the Vector instruction set is used to perform vector calculation. Different calculation units may be suitable for processing different data formats. For example, in the NPU, the Cube unit is suitable for processing matrix data. Therefore, data having a matrix data format (for example, the NZ format) is typically input into Cube. The Vector unit is suitable for processing vector data. Therefore, data in a vector data format (for example, the ND format) is usually input into the Vector unit, where the "NZ" and "ND" are merely identifiers of the format.

The foregoing neural network model includes a large quantity of operators. The operator may be a code set that is in the neural network model and that completes a calculation function, and includes a parameter used for performing the calculation, a specific calculation operation, and the like. For example, the neural network model may include an operator such as an adding operator (ADD), a multiplicating operator (MUL), an absolute value operator (ABS), a matrix multiplication operator (MatMul), a convolution operator (ConV), a deconvolution operator (DConV), a fully connecting operator (FC), a rectified linear unit (RELU) activation operator, or the like. Different operators are suitable for different calculation units because of different specific computation processes and complexity. For example, operators such as the ConV operator, the DconV operator, and the MatMul operator are used for matrix calculation, and are suitable for performing calculation through the Cube unit in the NPU. Operators such as the ADD operator, the RELU operator, the ABS operator, and the Mul operator are mainly used for vector calculation, and are suitable for performing calculation through the Vector unit in the NPU. In addition, a parameter included in an operator corresponding to the Cube unit or to-be-processed data of an operator corresponding to the Cube unit also generally has the foregoing NZ format, and a parameter included in an operator corresponding to the Vector unit also generally has the foregoing ND format.

Figure 3:
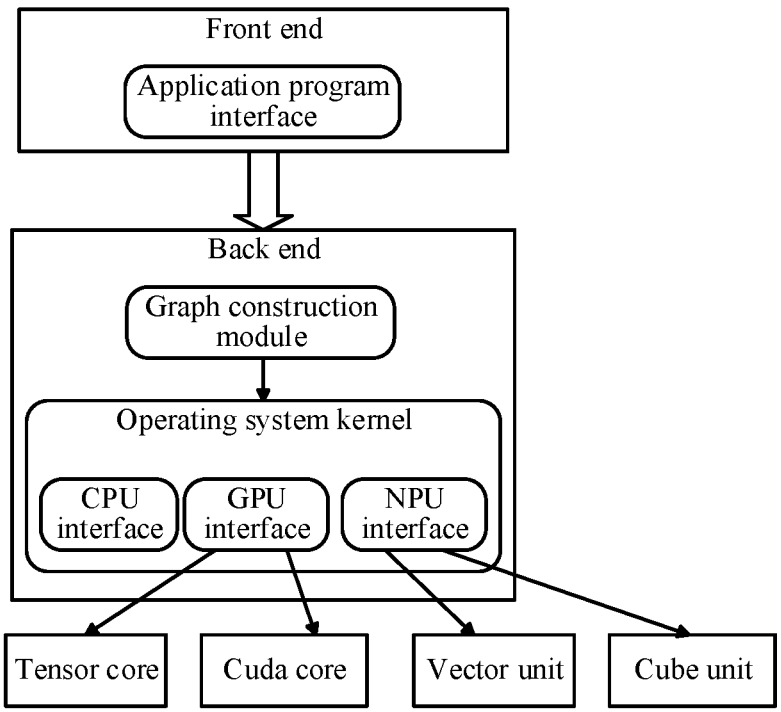
FIG. 3 is a diagram of a system architecture of a neural network framework.

In the training device 220, the neural network model may be trained and deployed through a general neural network framework. The neural network framework includes, for example, Tensorflow, Keras, and Pytorch. The following uses Tensorflow as an example to describe an architecture of the neural network framework. FIG. 3 is a diagram of a system architecture of a neural network framework. Referring to FIG. 3, a Tensorflow framework includes a front end and a back end. The front end is provided for a user, and serves as a user programming interface, and may provide application programming interfaces of a c/c++ version, a python version, a java version, and another programming language version, to facilitate the user to write neural network model code of the user. The back end includes a graph construction module and an operating system kernel. The operating system kernel includes an application programming interface (Application Programming Interface, API) of each hardware, such as a CPU interface, a GPU interface, and an NPU interface. The graph construction module generates a neural network calculation flow graph based on neural network model code submitted by the user and input data of a model. The neural network calculation flow graph is a data set that includes various operators, parameters, and network topology structures. Then, the graph construction module disassembles and maps the neural network calculation flow graph to each calculation unit of each processor based on a calculation unit corresponding to the operator. The operating system kernel invokes a corresponding hardware interface based on the foregoing neural network calculation flow graph, so that a corresponding calculation unit in a corresponding processor performs data processing. For example, as shown in FIG. 3, the operating system kernel invokes the NPU interface, so that a Vector unit or a Cube unit performs processing, or the operating system kernel invokes the GPU interface, to cause a Tensor core or a Cuda core to perform processing. After completing data processing, the calculation unit may return a processing result to the user through the neural network framework. Generally, a neural network model is trained in a neural network framework of a computer such as a personal computer (PC) or a server, and then the trained neural network model is fixed into a file. Then, a neural network framework of a device such as a mobile device or a PC parses the file and reads the file into a memory, so that operators in the neural network model may be sequentially executed to perform prediction through the neural network model.

Figure 4:
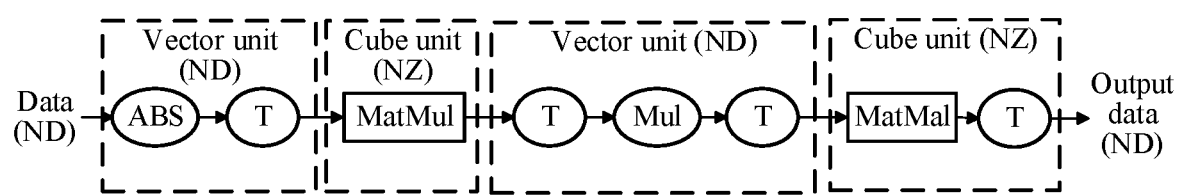
FIG. 4 is a schematic diagram of a partial neural network calculation flow graph generated by a graph construction module.

FIG. 4 is a schematic diagram of a partial neural network calculation flow graph generated by a graph construction module.

In the calculation flow graph shown in FIG. 4, data is alternately processed through a Vector unit and a Cube unit in an NPU. Because the Vector unit is suitable for using an ND data format, and the Cube unit is suitable for using an NZ data format, a plurality of data conversion operators (shown as "T" in FIG. 4) need to be included in the calculation flow graph. Referring to FIG. 4, it is assumed that data that is initially input into the Vector unit has the ND format. After performing computation on data, an ABS operator in the Vector unit inputs the data into a T operator. The T operator converts the input data in the ND format into data in the NZ format, and then inputs the data into a MatMul operator (namely, a matrix multiplication operator) in the Cube unit. After completing the computation, the MatMul operator inputs output data in the NZ format into the T operator in the Vector unit, and the T operator converts the data in the NZ format into data in the ND format and then inputs the data in the ND format into the Mul operator (namely, a multiplication operator), so that the Mul operator may process the data in the ND format. Then, after the computation is completed, the Mul operator inputs output data in the ND format into the T operator, to convert the data in the ND format into the data in the NZ format, and then inputs the data in the NZ format into the MatMal operator in the Cube unit. After the MatMal operator processes the input data in the NZ format, the output data in the NZ format is input into the T operator, to convert the data in the NZ format into data in a format (for example, the ND format) required by another processor that receives the data, to input the data into the another processor for processing. It may be learned that to run the neural network model by using a heterogeneous calculation unit, a plurality of T operators need to be added to the neural network calculation flow graph. Correspondingly, when the neural network model is run based on the neural network calculation flow graph (for example, model training or model prediction is performed), a plurality of data conversion operations need to be performed. This increases a computation amount and reduces a training or prediction speed of the neural network model.

In embodiments of the present application, a general format supported by a plurality of heterogeneous calculation units in one or more processors is preset, a conversion operator used to convert input data into the general format is added to the model at a back end of a neural network framework in a model training process or model prediction process, and both a format of input data and a format of an output data of each operator in the neural network model are modified to the foregoing general format. Therefore, data conversion operations may be greatly reduced in an execution process of the neural network model, an efficient running of the neural network model is implemented.

Figure 5:
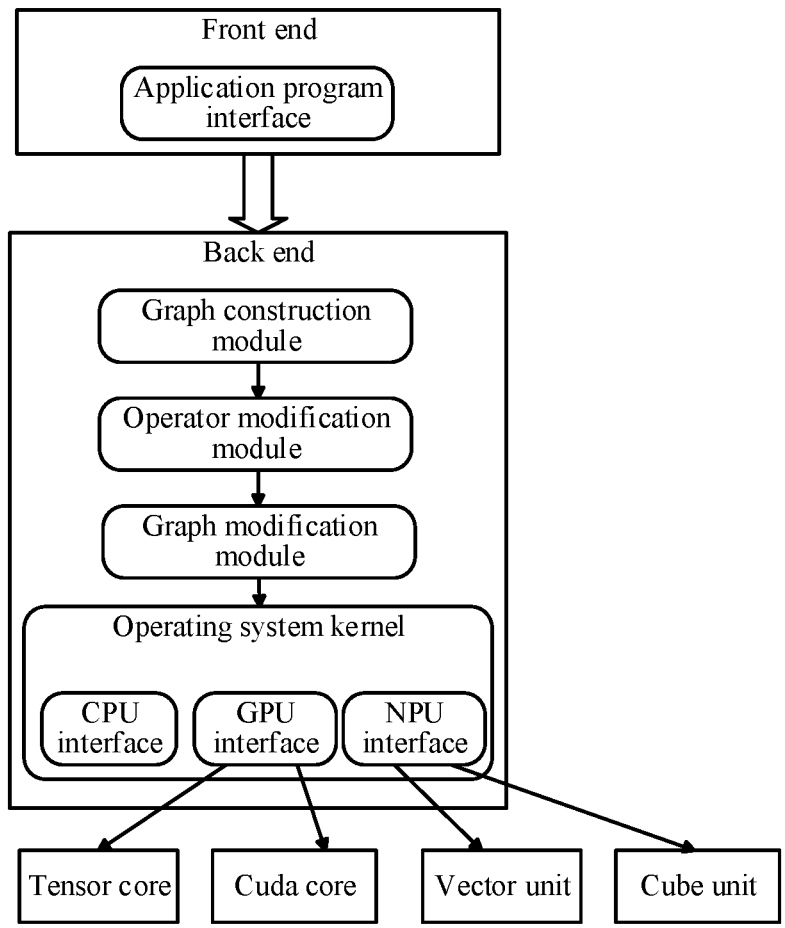
FIG. 5 is a diagram of a system architecture of a neural network framework according to an embodiment of the present application.

FIG. 5 is a diagram of a system architecture of a neural network framework according to an embodiment of the present application. As shown in FIG. 5, a difference from the framework shown in FIG. 1 lies in that, at a back end of the framework, after a graph construction module constructs a neural network calculation flow graph based on neural network model code and input data, a graph modification module adds, to a calculation flow graph, a conversion operator used to convert data into a general format, and an operator modification module modifies an operator in a neural network model to support the general format. After the modification, the graph modification module modifies the neural network calculation flow graph generated by the graph construction module, and the neural network model is run based on the modified calculation flow graph. The module shown in FIG. 5 may be considered as a segment of code for implementing a corresponding function in the neural network framework. The code is run by a processor (such as a CPU or an application processor) in a device (such as the execution device 210 or the training device 220) that runs the neural network framework to implement the corresponding function. It may be understood that the modules shown in FIG. 5 are not limited to the foregoing software form, and may also be in a hardware form. For example, the modules may be calculation circuits that implement specific functions in the processor.

Figure 6:
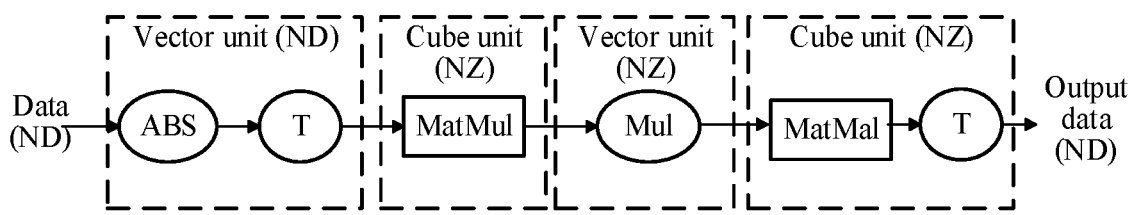
FIG. 6 is a partial calculation flow graph of a neural network model according to an embodiment of the present application.

FIG. 6 is a partial calculation flow graph of a neural network model according to an embodiment of the present application. It is assumed that a data format NZ is set to a general format used in an NPU, where both a Vector unit and a Cube unit support calculation of data in the NZ format. As shown in FIG. 6, it is assumed that initial input data is in an ND format, and an ABS operator supports data calculation in the ND format. In this case, data in the ND format output by the ABS operator only needs to be converted into the data in the NZ format through a T operator after the ABS operator in the flow graph. As shown in FIG. 5, because a Mul operator is modified to support processing of the data in the NZ format through an operator modification module, in the Vector unit, the data in the NZ format that is output from the MatMul operator may be directly input into the Mul operator for computation, and the data in the NZ format does not need to be converted into the data in the ND format before computation. Compared with the calculation flow graph shown in FIG. 4, two T operators are reduced. It may be understood that the calculation flow graph shown in FIG. 6 is merely an example, and is not intended to limit the scope of embodiments of the present application. For example, the general format is not limited to the NZ format, and is not limited to a general format used by an NPU. When a neural network model is running, for example, a GPU is used, a general format used by both the GPU and the NPU may be further designed. The general format has a high data dimension, so that data in the NPU and the GPU may be included. In this way, even if different processors are used in a running process of the neural network model, data conversion operations may be greatly reduced. An example of running the neural network model by using different processors is described in detail below with reference to FIG. 13.

Figure 7:
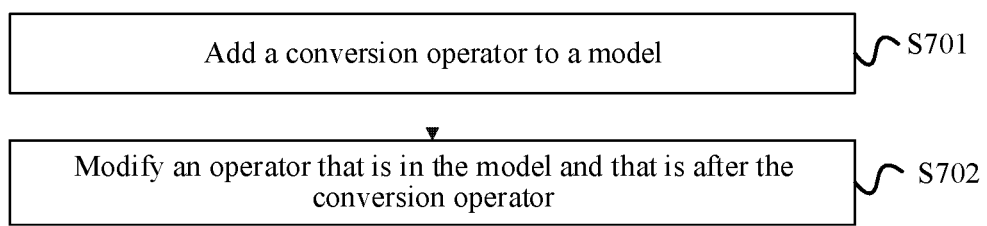
FIG. 7 is a flowchart of a model processing method according to an embodiment of the present application.

FIG. 7 is a flowchart of a model processing method according to an embodiment of the present application. The method includes the following steps.

Step S701. Add a conversion operator to a model, to convert data input into the conversion operator into a general format.

Step S702. Modify another operator that is in the model and that is after the conversion operator, to cause formats of both input data and output data of the another operator to be the general format.

The following describes in detail an execution process of each step of the method shown in FIG. 7.

First, in step S701, the conversion operator is added to the model, to convert data input into the conversion operator into the general format.

The method may be performed by a CPU in a calculation device (for example, the training device 220 or the execution device 210), or may be performed by another processor configured to run an application. When a user wants to run a specific neural network model (for example, train the neural network model or use the neural network model for prediction), the user inputs input data of the neural network model into a neural network framework that stores the neural network model, to run the neural network model. The following uses training of the neural network model as an example for description.

To train the model, a plurality of training samples of a to-be-predicted object need to be obtained, and the training samples include a feature vector and a label value of the to-be-predicted object. Then, the feature vector of the to-be-predicted object is used as input data of the model and is input into the model, so that each layer of the model performs computation on the input data, to obtain a predicted value of the model relative to the to-be-predicted object, and adjust a parameter of the model based on a loss function, to reduce a difference between the predicted value and the label value of the model. This optimizes prediction performance of the model.

As described above, in actual model training, after the neural network framework receives code of the neural network model in advance through a front end, a user (for example, a service person who trains the model) may input the feature vector included in the training sample of the model into the neural network framework, so that the neural network framework may run the model based on the feature vector, to obtain an output value of the model, and a calculation device may train the model based on the output value and the label value.

Referring to FIG. 5, after the neural network framework receives the input data of the model, in the neural network framework, the neural network calculation flow graph shown in FIG. 4 is first created through a graph construction module. Then, a back end of the neural network framework may determine, based on the calculation flow graph, a format supported by an operator included in the neural network model. Specifically, it may be determined, based on a data format supported by a calculation unit that runs each operator in the calculation flow graph, that an ABS operator and a Mul operator run in a Vector unit, a data format supported by the ABS operator and the Mul operator is an ND format supported by the Vector unit, a MatMul operator runs in a Cube unit, and a data format supported by the MatMul operator is an NZ format supported by the Cube unit. It may be understood that embodiments of the present application are not limited to determining, based on the calculation flow graph, a format of the operator included in the neural network model, but may include any other manner in which the format of the operator included in the neural network model may be determined.

It is assumed that a data format of the ABS operator input in FIG. 4 is the ND format, and it is assumed that both the Cube unit and the Vector unit support the NZ format. Therefore, the NZ format may be determined as a general format of data processed in an NPU. In this case, when modifying the calculation flow graph shown in FIG. 4, the graph modification module in FIG. 5 may retain the first T operator in FIG. 4, to convert data in the ND format that is output from the ABS into data in the NZ format.

In another implementation, it is assumed that, based on the NZ format supported by the Cube unit and the ND format supported by the Vector unit, the NX format supported by both the Cube unit and the Vector unit is determined as a general format of data processed in an NPU, where the NX format may allow conversion from data in the ND format and data in the NZ format to data in the NX format, and the NX format facilitates modification from an operator supporting the NZ format and an operator supporting the ND format to an operator supporting the NX format. Therefore, when modifying the calculation flow graph shown in FIG. 4, the graph modification module in FIG. 5 modifies the first T operator in FIG. 4, to convert data in the ND format that is output from the ABS into data in the NX format.

In another implementation, the graph construction module may first generate a calculation flow graph that includes only the ABS operator, the MatMul operator, and the Mul operator in FIG. 4 (to be specific, the T operator is not included). In this case, the graph modification module may add the T operator after the ABS operator of the calculation flow graph, to convert the data in the ND format that is output from the ABS into data in the general format.

In another implementation, the graph modification module may add the T operator before the ABS operator of the calculation flow graph shown in FIG. 4. The operator is used to convert a format of the input data into the general format (for example, the NZ format or the NX format). It may be understood that a location of the T operator added to the model is not limited to the foregoing description. For example, the T operator may be added in the middle of the model, to convert data input into the T operator into the general format. Specifically, the T operator may be disposed at an interaction between different calculation units (or calculation circuits) based on a calculation flow graph of a model, to convert data output by a previous calculation unit into the data in the general format and then input the data in the general format into a next calculation unit. For example, for the calculation flow graph shown in FIG. 4, if the general format is the NX format, a T operator configured to convert the data in the NZ format into the data in the NX format may be set at an interaction between the Cube unit and the Vector unit before the Mul operator.

In step S702, another operator that is in the model and that is after the conversion operator is modified, to cause formats of both input data and output data of the another operator to be the general format.

The general format is a preset format of a high dimension, so that data having a format of a low dimension is converted into the general format. For example, for the NPU, because the NZ format is a format corresponding to a matrix, and the ND format is a format corresponding to a vector, to be specific, a dimension of the NZ format is greater than a dimension of the ND format, the NZ format may be preset as a general format. In this case, it may be determined that all operators (only the Mul operator is shown in the figure) corresponding to the Vector unit after the first T operator in FIG. 4 do not support the general format, and the operators need to be modified.

As shown in FIG. 5 and FIG. 6, for example, an operator is modified through an operator modification module, so that a modified operator and a calculation procedure are adapted to a format, a procedure, and task scheduling of data in the general format. Specifically, the operator (for example, the Mul operator) is modified, so that the data in the general format (for example, the NZ format is determined as the general format) may be input into the operator, and the data in the general format may be output from the operator, to be specific, both a format of input data and a format of output data of the operator are the general format.

The operator may be modified based on the determined general format and a computation process in the operator. In a case, the operator consistently processes each piece of data in the input data, so that the operator may input data in the general format and output data in the general format by modifying a declaration of the format of the input data and the format of the output data in the operator. For example, an operator may be abstracted as a function instance Z (dtype1, format1, variable1). variable1 is a variable name, and corresponds to input data of the function Z. dtype1 is a declared data type of the variable variable1, and format1 is a declared format of the variable variable1. To adapt to the data in the general format, the function Z may be modified to Z (dtype1, formatGeneral, variable1), to be specific, the format of the variable variable1 is declared as the general format formatGeneral, to adapt to the data in the general format.

In another optional case, the input data and the output data of the operator in the general format have a larger or smaller data amount than that in an original format. Therefore, larger or smaller storage space (for example, a register) is required. Therefore, in addition to modifying the declaration of the operator for the input data and the output data, the operator modification module further modifies an operation on the storage space in a data processing process of the operator. Specifically, the operator modification module adds or deletes a storage address for storing the input data of the operator, intermediate data in the operator processing process, or the output data of the operator, to perform task scheduling such as data access relative to the input data of the operator, the intermediate data, or the output data of the operator in the general format.

In another optional case, the operator includes a parameter (the parameter is a coefficient in a function included in the operator, for example, function parameters a, W, and b at a layer of the neural network model) for performing computation on the input data. To enable the operator to support processing of the data in the general format, the declaration of the format of the input data and the format of the output data in the operator is modified, and a format of the parameter included in the operator may be further modified to a format of the parameter that supports computation on the data in the general format, for example, a format of the parameter that supports the data in the ND format is modified to a format of the parameter that supports the data in the NZ format. The following describes, with reference to FIG. 8 and FIG. 9, modification of the format of the parameter in the operator in this case.

Figure 8:
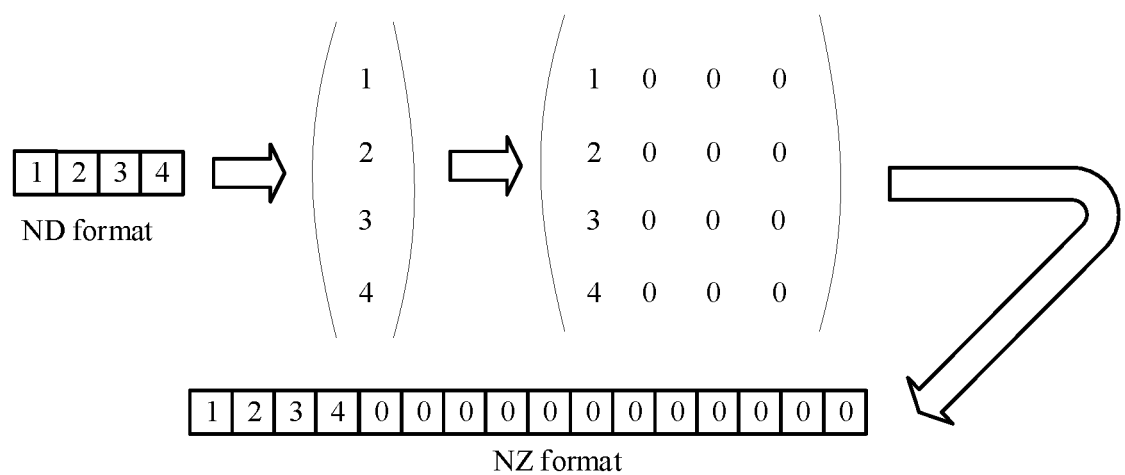
FIG. 8 is a schematic diagram of a conversion process of converting data in an ND format into data in an NZ format.

FIG. 8 is a schematic diagram of a conversion process of converting data in an ND format into data in an NZ format. As shown in FIG. 8, it is assumed that data "1 2 3 4" in the ND format corresponds to a vector shown in FIG. 8, and the vector is a parameter in an operator (for example, the ABS operator in FIG. 4) corresponding to a Vector unit. It is assumed that the vector in FIG. 8 may be converted into a matrix in FIG. 8 based on a correspondence between a dimension of an operator used for the Vector unit and a dimension of an operator used for a Cube unit, and the matrix is a 4×4 matrix. The vector corresponds to a column in the matrix in FIG. 8. Therefore, the matrix in FIG. 8 may be generated by adding zero to the vector. Then, data "1 2 3 4 0 0 . . . 0 0" in the NZ format corresponding to the data "12 3 4" in the ND format may be obtained based on the matrix in FIG. 8. As shown in FIG. 8, a correspondence between the data in the NZ format and the matrix is that, for example, in the data, four elements in a first column of the matrix are first arranged, then four elements in a second column of the matrix are arranged, and then elements in a third column and a fourth column of the matrix are arranged.

The parameter in the operator, for example, has a storage form "w1w2w3w4" corresponding to the vector. The parameter is initially used to perform a vector multiplication computation, for example, on the data in the ND format in FIG. 8. To enable the operator to perform computation on the data in the NZ format in FIG. 8, the parameter may similarly correspond to the data in the NZ format by adding zero, to process the data in the NZ format in FIG. 8. For example, the modified parameter has the following storage form: "w1 w2 w3 w4 0 0 . . . 0 0".

Figure 9:
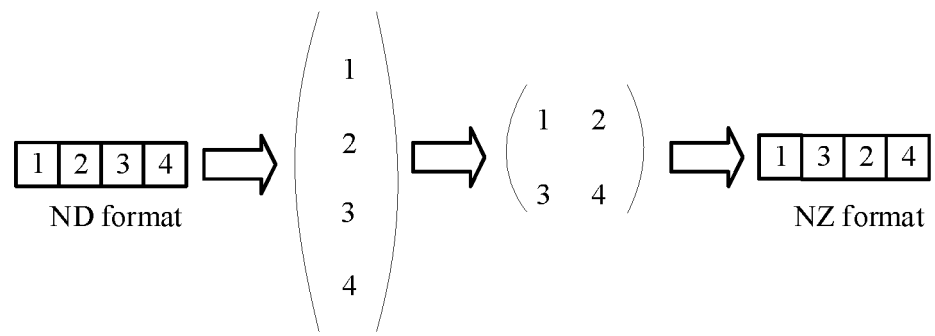
FIG. 9 is a schematic diagram of another conversion process of converting data in an ND format into data in an NZ format.

FIG. 9 is a schematic diagram of another conversion process of converting data in an ND format into data in an NZ format. Different from the process shown in FIG. 8, a vector in FIG. 9 may be converted into a matrix shown in FIG. 9 based on a correspondence between a dimension of an operator used for a Vector unit and a dimension of an operator used for a Cube unit. The matrix is a 2×2 matrix. A first element and a second element in the vector form a first row in the matrix, and a third element and a fourth element in the vector form a second row in the matrix. Then, the data in the NZ format corresponding to the data "1 2 3 4" in the ND format, namely, "1 3 2 4", may be obtained from the matrix in a manner similar to the foregoing manner. Similarly, it is assumed that the parameter in the operator, for example, has the following storage form "w1w2w3w4" corresponding to the vector. To enable the operator to process the data in the NZ format in FIG. 9, a location of each parameter in a parameter vector may be adjusted, so that each parameter corresponds to each element in the NZ format. For example, a storage form of the parameter in the operator after modification is "w1 w3 w2 w4", so that each parameter is multiplied by corresponding data.

It may be understood that the NZ format, the ND format, and the dimension of the operator used for the Vector unit and the dimension of the operator used for the Cube unit shown in FIG. 8 and FIG. 9 are merely examples, and are not used to limit the scope of embodiments of the present application. The NZ format and the ND format may have other specific forms, and the dimension of the operator used for the Vector unit and the dimension of the operator used for the Cube unit may be other preset specific values.

After the foregoing operator in the model is modified, the graph modification module in FIG. 5 may modify, based on the modified operator, the calculation flow graph shown in FIG. 4. Specifically, because both input data and output data of the modified Mul operator are data in the NZ format, two T operators before and after the Mul operator are not required in the calculation flow graph, so that the calculation flow graph shown in FIG. 6 may be obtained. A neural network framework may invoke the Vector unit and the Cube unit in an NPU based on the newly generated calculation flow graph, to perform a training process of the neural network model. In the training process, when the neural network model predicts a feature vector in each of a plurality of training samples, except the first T operator and the last T operator shown in FIG. 6, another data conversion process is not included in the training process. This greatly reduces calculation power and model prediction time.

In another implementation provided in embodiments of the present application, the neural network framework may determine a general format relative to a plurality of heterogeneous calculation units in a GPU. For example, the GPU includes a Cuda core and a Tensor core, where a number height width channel format (NHWC) is supported by an operator run by the Cuda core, and a number channel height width format (NCHW) is supported by an operator run by the Tensor core. N represents a number of images, C represents a number of channels, H represents an image height, and W represents an image width. The NHWC format and the NCHW format are different data arrangement manners for data (for example, image data). If different data arrangement formats are used for the same image data, data of the image data that is correspondingly stored in a device is inconsistent.

Figure 10:
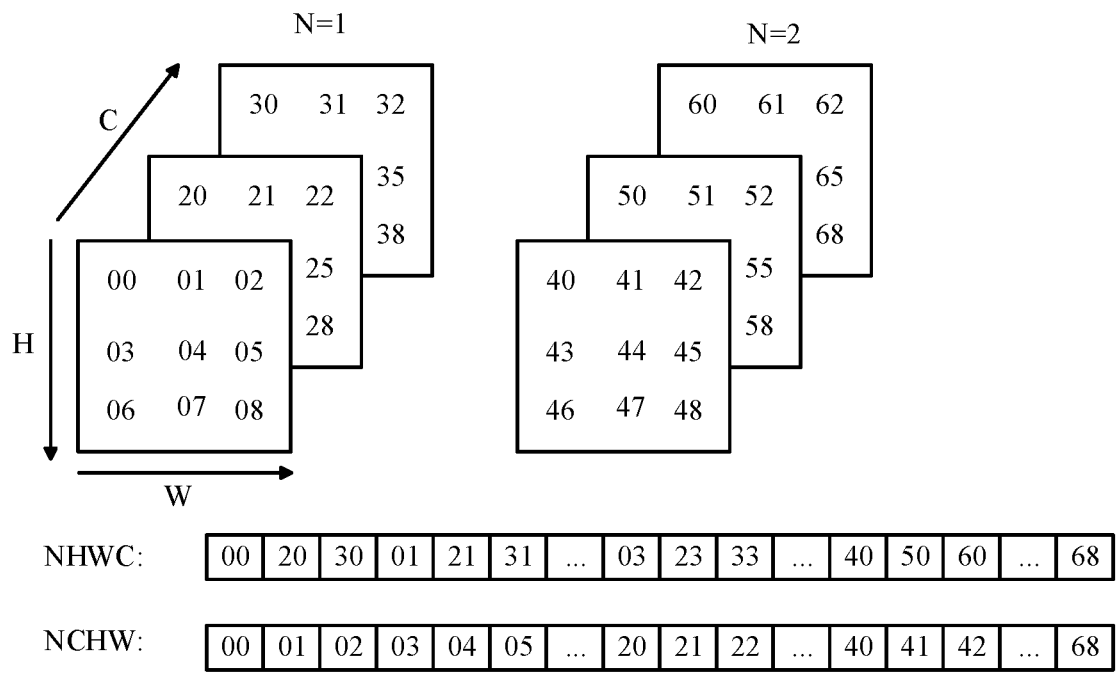
FIG. 10 is a schematic diagram of an NHWC format and an NCHW format.

FIG. 10 is a schematic diagram of an NHWC format and an NCHW format.

As shown in FIG. 10, the NHWC format refers to arranging image data based on a C-W-H-N sequence. In NHWC format data corresponding to the image data in FIG. 10, three values, namely, 00, 20, and 30, in a C direction, are first arranged from minimum C, H, and W of an image 1 (namely, N=1). Then an element in the image 1 is moved along a W direction to a second element in the W direction, three element values 01, 21, and 31 corresponding to a second element in the W direction are arranged starting from a fourth element of the NHWC format data, then one element continues to be moved along the W direction in the image 1, and three element values in the C direction corresponding to a new W element value continue to be arranged in the NHWC format data. After the movement in the W direction in the image 1 ends, one element is moved in an H direction, so that a second element in the H direction and three element values, namely, 03, 23, and 33, in the C direction corresponding to the first element in the W direction are arranged in the data in the NHWC format. Then, the second element in the H direction and three element values in the C direction corresponding to the second element in the W direction may be arranged. After the movement in the W direction corresponding to the second element in the H direction ends, another element may be moved in the H direction, and elements in the image data are arranged in the same sequence as the foregoing one until the last element 38 in the image 1. Then, the same data arrangement may be performed on an image 2 (namely, N=2), to obtain the data in the NHWC format shown in FIG. 11.

The data in the NCHW format shown in FIG. 10 is obtained by arranging the image data based on a sequence of W-H-C-N, and details are not described herein again.

Because the NHWC format and the NCHW format have a same data dimension, and both are formats supported by a Cuda core and a Tensor core, the neural network framework may set one of the formats (for example, the NHWC format) as a general format of data processed in a GPU relative to the Cuda core and the Tensor core in the GPU.

Figure 11:
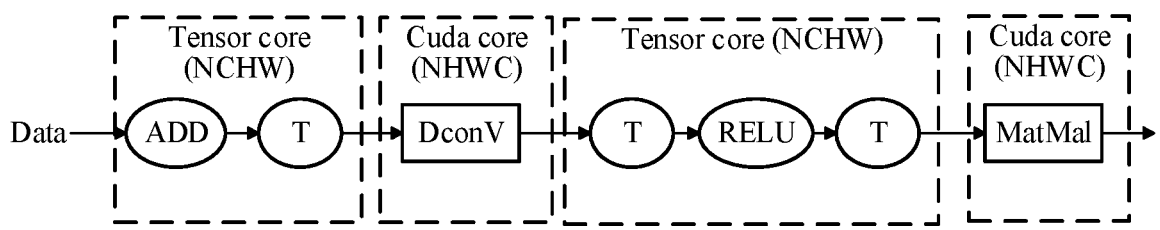
FIG. 11 is a schematic diagram of a partial neural network calculation flow graph generated by a graph construction module in a neural network framework.

FIG. 11 is a schematic diagram of a partial neural network calculation flow graph generated by a graph construction module in a neural network framework. The calculation flow graph is a calculation flow graph generated based on a format of data input into a GPU in a model running process relative to a Tensor core and a Cuda core in the GPU. Similar to FIG. 4, the calculation flow graph includes a plurality of T operators, to perform format conversion on processed data. When the neural network framework sets an NHWC format corresponding to the Cuda core to a general format in the GPU, the neural network framework may determine that an operator (for example, an RELU operator) running in the Tensor core after a first T operator in FIG. 11 needs to be modified. Therefore, the RELU operator may be modified to support the NHWC format with reference to the data arrangement manner shown in FIG. 10. After the modification is performed, the neural network framework may modify the calculation flow graph shown in FIG. 11. The RELU operator processes each element in image data in the same manner. Therefore, a declaration of a format of input data and a format of output data in the RELU operator is modified from an NCHW format to the NHWC format. To be specific, the RELU operator may input NHWC data and output NHWC data.

Figure 12:
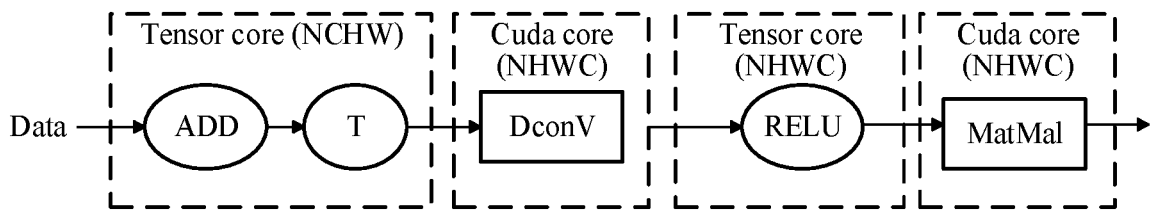
FIG. 12 is a partial calculation flow graph of a neural network model according to an embodiment of the present application.

FIG. 12 is a partial calculation flow graph of a neural network model according to an embodiment of the present application. As shown in FIG. 12, after the calculation flow graph shown in FIG. 11 is modified, it is assumed that data input into a GPU is in an NCHW format, only one T operator needs to be set after an ADD operator in the calculation flow graph. In this case, both an operator corresponding to a Tensor core and an operator corresponding to a Cuda core support processing of data in an NHWC format. Therefore, the T operator is not required in the middle of the calculation flow graph, and a quantity of T operators is reduced compared with the calculation flow graph shown in FIG. 11. In a process of running the neural network model based on the calculation flow graph, data conversion operations may be reduced. This implements efficient running of the neural network model.

Figure 13:
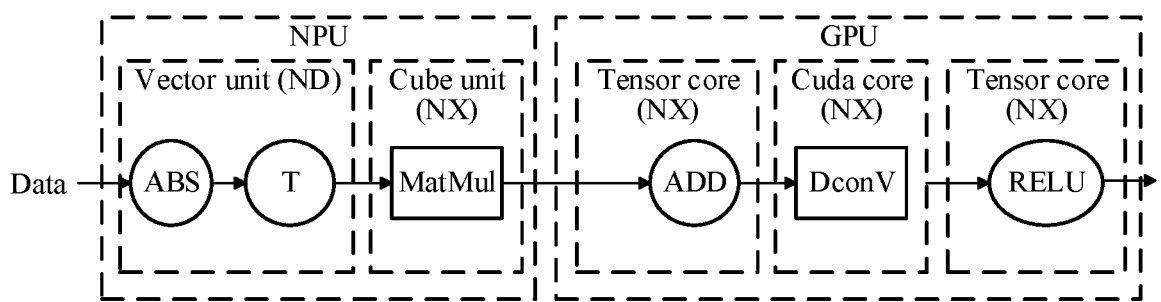
FIG. 13 is a schematic diagram of another neural network calculation flow graph according to an embodiment of the present application.

FIG. 13 is a schematic diagram of another neural network calculation flow graph according to an embodiment of the present application. It is assumed that a general format (an NX format) is preset in a neural network framework relative to a plurality of processors such as an NPU and a GPU. It is clear that, dimensions of the NX format should be at least four dimensions, to include dimensions in an NZ format, an ND format, an NCHW format, and an NHWC format, and all calculation units included in the NPU and the GPU support the NX format. In this case, the neural network framework may determine, based on a format (for example, the ND format) of the input data and a format (namely, the ND format) supported by an ABS operator, to set a T operator after the ABS operator in the calculation flow graph. The T operator is used to convert data in the ND format into data in the NX format. Then, the neural network framework modifies all operators that are in the neural network model and that are run by a Vector unit, a Cube unit, a Tensor core, and a Cuda core after the T operator, so that all the operators support processing of the data in the NX format, to be specific, the data in the NX format may be input into the operator, and the operator may output the data in the NX format after processing the input data. After the modification, the neural network framework may obtain the calculation flow graph shown in FIG. 13. In the calculation flow graph, only one T operator needs to be included after the ABS operator of the calculation flow graph, to convert data input into the T operator into the NX format. In a subsequent process in which the NPU and the GPU are used for data processing, because all operators run by the NPU and the GPU support the NX format, the T operator does not need to perform format conversion on to-be-processed data. Therefore, a data conversion operation in a running process of the neural network model is greatly reduced, and running efficiency of the neural network model is improved.

Figure 14:
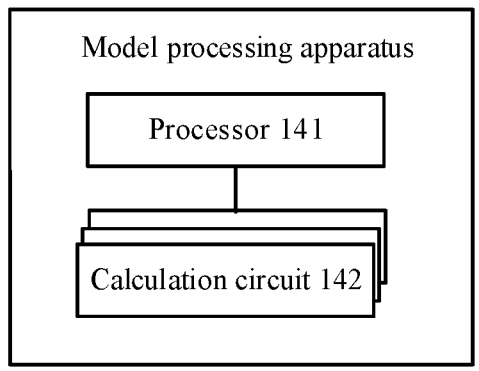
FIG. 14 is a diagram of an architecture a model processing apparatus according to an embodiment of the present application.

FIG. 14 is a diagram of an architecture a model processing apparatus according to an embodiment of the present application, including a processor 141 and a plurality of heterogeneous calculation circuits 142. The model processing apparatus is configured to perform the method shown in FIG. 7, and may be the execution device 210 or the training device 220 in FIG. 2.

The processor 141 is configured to: receive input data of the model, where the model includes a plurality of operators, the plurality of operators run on the plurality of calculation circuits 142, and the plurality of calculation circuits 142 correspond to different data formats; add a first conversion operator to the model based on a format supported by the operators included in the model and a format of the input data, to convert data input into the first conversion operator into a general format, where the general format is a data format supported by all the plurality of calculation circuits; and modify an operator that is in the model and that is after the first conversion operator, to cause the operator to process data that is in the general format and that is input into the operator, and output the data in the general format.

In a possible implementation, the plurality of calculation circuits 142 are configured to: after modifying the operator that is in the model and that is after the first conversion operator, run a corresponding operator in the model based on the input data of the model, to train the model or obtain output data of the model.

In a possible implementation, the processor 141 is further configured to: after the receiving input data of the model, determine, based on a calculation circuit corresponding to each operator, different formats corresponding to a plurality of operators included in the model, and determine the general format based on the different formats corresponding to the plurality of operators included in the model.

In a possible implementation, the processor 141 is further configured to: after receiving a model and input data of the model, generate a calculation flow graph of the model based on the model and the input data of the model, where the calculation flow graph includes the plurality of operators and a plurality of conversion operators between the plurality of operators, and that the processor is configured to add a first conversion operator to the model includes: The processor is specifically configured to replace the $1^{st}$ conversion operator in the plurality of conversion operators with the first conversion operator; and the processor 141 is further configured to update the calculation flow graph after the modifying an operator that is in the model and that is after the first conversion operator.

In a possible implementation, the processor 141 is further configured to add a second conversion operator to an end of the model, to cause the output data of the model to have a predetermined format.

In a possible implementation, the plurality of heterogeneous calculation circuits 142 include a matrix calculation circuit and a vector calculation circuit that are in a neural-network processing unit NPU, the general format is a first format corresponding to the matrix calculation circuit, and that the processor is configured to modify an operator that is in the model and that is after the first conversion operator includes: The processor is specifically configured to modify an operator that is in the model, that is after the first conversion operator, and that runs on the vector calculation circuit.

It may be understood that the units included in the model processing apparatus may be any form of software, hardware, or firmware. This is not limited in this application.

Figure 15:
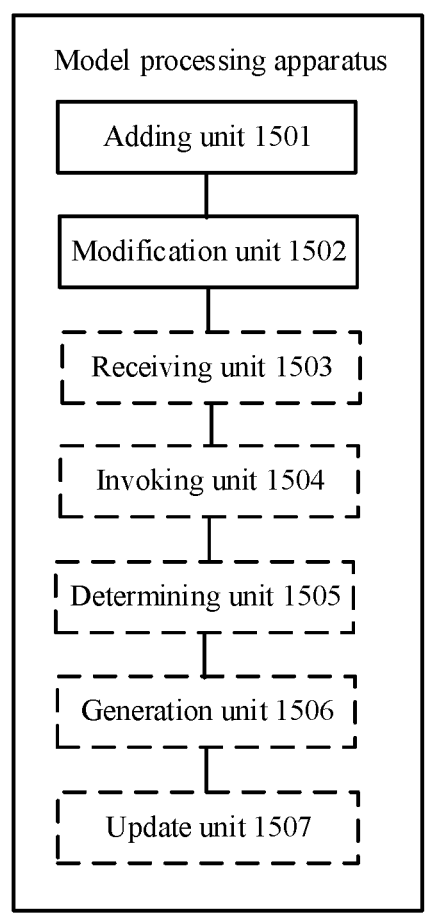
FIG. 15 is a diagram of an architecture of a model processing apparatus according to an embodiment of this application.

FIG. 15 is a diagram of an architecture of a model processing apparatus according to an embodiment of this application. The model includes a plurality of operators, the plurality of operators run on a plurality of calculation circuits, the plurality of calculation circuits correspond to different data formats, and the model processing apparatus includes: an adding unit 1501, configured to add a first conversion operator to the model, to convert data input into the first conversion operator into a general format, where the general format is a data format supported by all the plurality of calculation circuits; and a modification unit 1502, configured to modify another operator that is in the model and that is after the first conversion operator, to cause formats of both input data and output data of the another operator to be the general format.

In a possible implementation, the model processing apparatus further includes: a receiving unit 1503, configured to receive input data of the model, and an invoking unit 1504, configured to: after the modifying an operator that is in the model and that is after the first conversion operator, invoke the plurality of calculation circuits to run corresponding operators in the model to process the input data, to train the model or obtain output data of the model.

In a possible implementation, the model processing apparatus further includes: a determining unit 1505, configured to: after the receiving input data of the model, determine, based on a calculation circuit corresponding to each operator, different data formats corresponding to the plurality of calculation circuits, and determine the general format based on the different data formats corresponding to the plurality of calculation circuits.

In a possible implementation, the adding unit 1501 is specifically configured to determine, based on the model and the input data of the model, a location for adding the first conversion operator to the model.

In a possible implementation, the model processing apparatus further includes: a generation unit 1506, configured to: after the receiving input data of the model, generate a calculation flow graph of the model based on the model and the input data of the model, where the calculation flow graph includes the plurality of operators and a plurality of conversion operators between the plurality of operators, and the adding unit 1501 is specifically configured to replace the $1^{st}$ conversion operator in the plurality of conversion operators with the first conversion operator; and the apparatus further includes: an update unit 1507, configured to update the calculation flow graph after the modifying an operator that is in the model and that is after the first conversion operator.

In a possible implementation, the adding unit 1501 is further configured to add a second conversion operator before an output end of the model, to cause the output data of the model to have a predetermined format.

In a possible implementation, the plurality of calculation circuits include a matrix calculation circuit and a vector calculation circuit in the NPU, the general format is a first format corresponding to the matrix calculation circuit, and the modification unit 1502 is specifically configured to: modify an operator that is in the model, that is after the first conversion operator, and that runs on the vector calculation circuit.

In a possible implementation of the third aspect of this application, the plurality of calculation circuits include a convolution calculation circuit and a tensor calculation circuit that are in the GPU, the general format is a second format corresponding to the convolution calculation circuit, and the modification unit 1502 is specifically configured to modify an operator that is in the model, that is after the first conversion operator, and that runs on the tensor calculation circuit.

It may be understood that the units included in the model processing apparatus may be any form of software, hardware, or firmware. This is not limited in this application.

Embodiments of the present application further provide a computer-readable storage medium, storing a computer program; and when the computer program is executed in a calculation device, the calculation device is enabled to perform the method shown in FIG. 7 in this application.

Embodiments of the present application further provide a calculation device, including a memory and a processor, where the memory stores executable code; and when executing the executable code, the processor implements the method shown in FIG. 7 in this application.

Embodiments of the present application further provide a computer program product, where when the computer program product is run on a calculation device, the calculation device is enabled to perform the method shown in FIG. 7 in this application.

Figure 16:
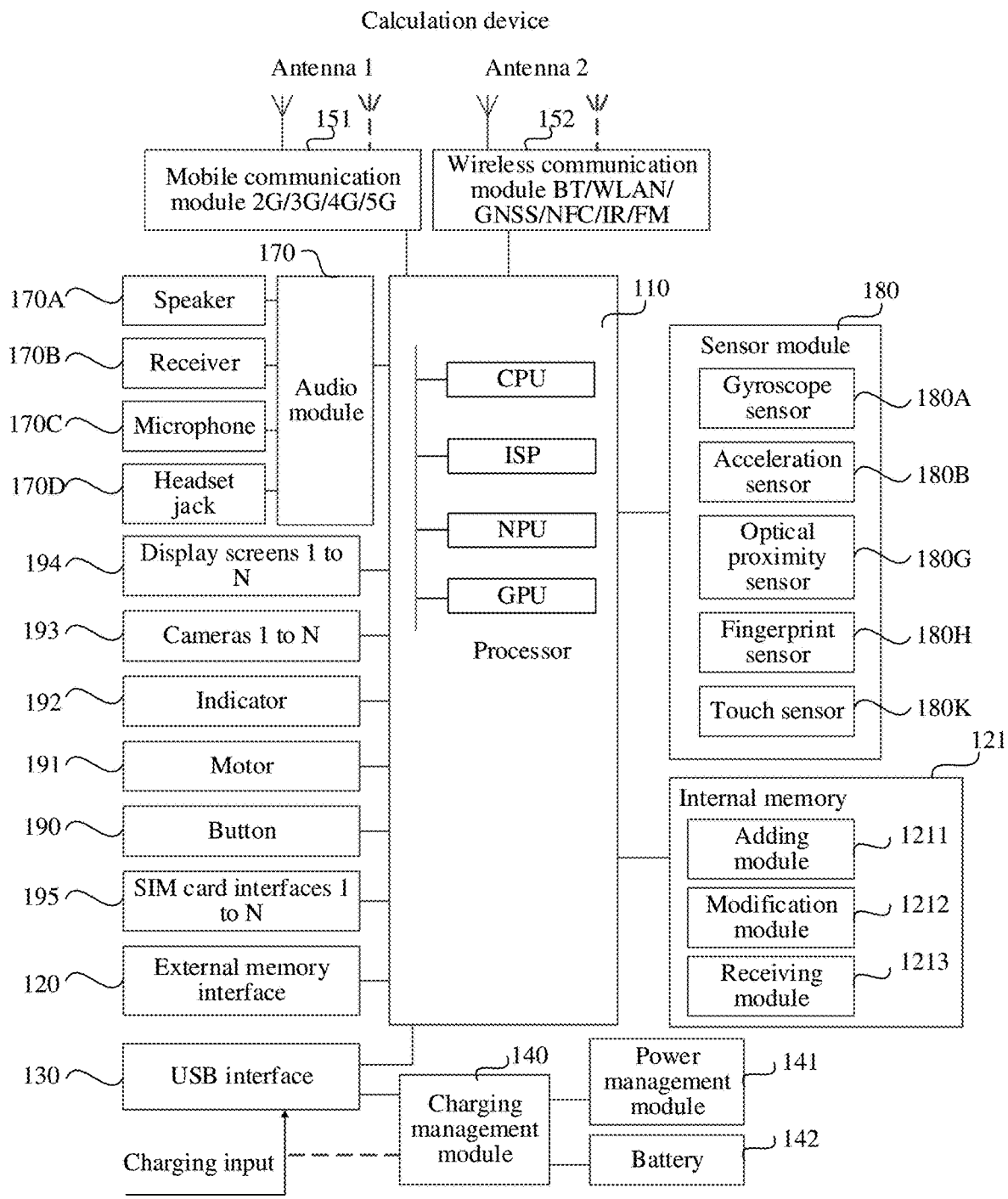
FIG. 16 is a schematic diagram of a structure of a calculation device applied to a model processing method and apparatus according to an embodiment of the present application.

FIG. 16 is a schematic diagram of a structure of a calculation device applied to a model processing method according to an embodiment of the present application. The calculation device may include a processor 110, an external memory interface 120, an internal memory 121, a universal serial bus (USB) interface 130, a charging management module 140, a power management module 141, a battery 142, an antenna 1, an antenna 2, a mobile communication module 151, a wireless communication module 152, an audio module 170, a speaker 170A, a receiver 170B, a microphone 170C, a headset jack 170D, a sensor module 180, a button 190, a motor 191, an indicator 192, a camera 193, a display screen 194, an SIM card interface 195, and the like. The sensor module 180 may include a gyroscope sensor 180A, an acceleration sensor 180B, an optical proximity sensor 180G, a fingerprint sensor 180H, and a touch sensor 180K. The calculation device may further include another sensor, such as a temperature sensor, a pressure sensor, a distance sensor, a magnetic sensor, an ambient light sensor, a barometric pressure sensor, or a bone conduction sensor, which is not shown in FIG. 16.

It may be understood that a structure shown in embodiments of the present application does not constitute a specific limitation on the calculation device. In some other embodiments of this application, the calculation device may include more or fewer components than those shown in the figure, or some components may be combined, or some components may be split, or components are arranged in different manners. The components shown in the figure may be implemented by hardware, software, or a combination of software and hardware.

The processor 110 may include one or more processing units. For example, the processor 110 may include at least one of an application processor (AP), a modem processor, a GPU, an image signal processor (ISP), a CPU, a video codec, a digital signal processor (DSP), a baseband processor, and/or an NPU. FIG. 16 shows a CPU, an ISP, an NPU, and an NPU in the processor 110, and the CPU, the ISP, the NPU, and the GPU may be connected through a bus. The plurality of calculation units in the method shown in FIG. 7 and the apparatus shown in FIG. 15 in this application may be at least two heterogeneous calculation units included in any one or more processing units. Different processing units may be independent components, or may be integrated into one or more processors. For example, the processor 110 may be a chip or a chip set. For example, the application processor may be the CPU.

A memory may be further disposed in the processor 110, and is configured to store instructions and data. The memory may store an instruction or data that has been used or cyclically used by the processor 110. If the processor 110 needs to use the instructions or the data again, the processor may directly invoke the instructions or the data from the memory. This avoids repeated access to the memory outside the processor 110, reduces waiting time of the processor 110, and improves system efficiency.

The display screen 194 is configured to display an image, a video, and the like. The display screen 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light-emitting diode (QLED), or the like. In some embodiments, the calculation device may include one or N display screens 194, where N is a positive integer greater than 1. The display screen 194 may be configured to display information entered by the user or information provided to the user, and graphical user interfaces (GUI). For example, the display screen 194 may display a picture, a video, a page, a file, or the like.

The external memory interface 120 may be configured to connect to an external storage card such as a micro SD card, to expand a storage capability of the calculation device. The external memory card communicates with the processor 110 through the external memory interface 120, to implement a data storage function. For example, a file such as an image or a video is stored in the external storage card.

The internal memory 121, also referred to as a main memory, may be configured to store computer-executable program code. The executable program code includes instructions. The processor 110 runs the instruction stored in the internal memory 121, to perform various function applications and data processing of the calculation device. The internal memory 121 may include a program storage area and a data storage area. The program storage area may store an operating system, code of an application program, and the like. For example, as shown in FIG. 16, the program storage area of the internal memory 121 stores a plurality of code modules such as an adding module 1211, a modification module 1212, and a receiving module 1213 that are configured to perform the method shown in FIG. 7. The adding module 1211 is configured to add a conversion operator to the model, to convert data input into the conversion operator into a general format, where the general format is a data format supported by all the plurality of calculation circuits. The modification module 1212 is configured to modify another operator that is in the model and that is after the conversion operator, to cause formats of both input data and output data of the another operator to be the general format. The receiving module 1213 is configured to receive input data of a model. The data storage area may store data created in a process of using the calculation device, and the like.

In addition, the internal memory 121 may include a random access memory (RAM), for example, a double data rate synchronous dynamic random access memory (DDR Memory), and may further include a non-volatile memory, for example, at least one magnetic disk storage device, a flash storage device, or a universal flash storage (UFS).

A wireless communication function of the calculation device may be implemented through the antenna 1, the antenna 2, the mobile communication module 151, the wireless communication module 152, the modem processor, the baseband processor, and the like.

The antenna 1 and the antenna 2 are configured to transmit and receive an electromagnetic wave signal. Each antenna of the calculation device may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 151 may provide a solution to wireless communication such as 2G/3G/4G/5G applicable to the calculation device. The mobile communication module 151 may include at least one filter, a switch, a power amplifier, a low noise amplifier (LNA), and the like. The mobile communication module 151 may receive an electromagnetic wave through the antenna 1, perform processing such as filtering or amplification on the received electromagnetic wave, and transmit the electromagnetic wave to the modem processor for demodulation. The mobile communication module 151 may further amplify a signal modulated by the modem processor, and convert the signal into an electromagnetic wave for radiation through the antenna 1. In some embodiments, at least some function modules of the mobile communication module 151 may be disposed in the processor 110. In some embodiments, at least some function modules of the mobile communication module 151 and at least some modules of the processor 110 may be disposed in a same device. In embodiments of the present application, the mobile communication module 151 may further be configured to perform information exchange with another terminal device, to be specific, send an audio output request to the another terminal device, or the mobile communication module 151 may be configured to receive an audio output request and package the received audio output request into a message in a specified format.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display screen 194. In some embodiments, the modem processor may be an independent component. In some other embodiments, the modem processor may be independent of the processor 110, and is disposed in a same device as the mobile communication module 151 or another function module.

The wireless communication module 152 may provide a solution, applied to the calculation device, to wireless communication including a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communication module 152 may be one or more devices integrating at least one communication processing module. The wireless communication module 152 receives an electromagnetic wave through the antenna 2, performs frequency modulation and filtering processing on an electromagnetic wave signal, and sends a processed signal to the processor 110. The wireless communication module 152 may further receive a to-be-sent signal from the processor 110, perform frequency modulation and amplification on the signal, and convert the signal into an electromagnetic wave for radiation through the antenna 2.

In addition, the calculation device may implement an audio function by using the audio module 170, the speaker 170A, the telephone receiver 170B, the microphone 170C, the headset jack 170D, the application processor, and the like, for example, music playback, recording, and the like. The calculation device may receive a button 190 input, and generate a button signal input related to user setting and function control of the calculation device. The calculation device may generate a vibration prompt (for example, an incoming call vibration prompt) by using the motor 191. The indicator 192 in the calculation device may be an indicator light, and may be configured to indicate a charging status and a power change, or may be configured to indicate a message, a missed call, a notification, and the like. The SIM card interface 195 in the calculation device is configured to connect to a SIM card. The SIM card may be inserted into the SIM card interface 195 or unplugged from the SIM card interface 195, to come into contact with or be separated from the calculation device.

The calculation device may implement a display function through the GPU, the display screen 194, the processor 110, and the like. The processor 110 may include one or more GPUs, which execute program instructions to generate or change display information. Optionally, the GPU may be located in the processor 110 or a device independent of the processor 110.

The calculation device may implement a photographing function through the ISP, the NPU, the camera 193, the video codec, the GPU, the display screen 194, the application processor, and the like. The camera 193 may include a lens group and a photosensitive element. For example, when the calculation device performs photographing, a shutter is opened, light is transferred to a photosensitive element of the camera through a lens, and the photosensitive element converts an optical signal into an electrical signal, and transfers the electrical signal to the ISP for processing. The ISP processes the data received from the camera 193, which includes processing the data through the NPU. In this way, the data is converted into a digital image signal. The ISP outputs the digital image signal to the DSP for processing. The DSP converts the digital image signal into an image signal in a standard RGB or YUV format, and the image signal may be displayed on the display screen 194 after being processed by the GPU and the application processor. In some embodiments, the calculation device may include one or N cameras 393, where N is a positive integer greater than 1. The video codec is configured to compress or decompress a digital video. The calculation device may support one or more video codecs. In this way, the calculation device may play or record videos in a plurality of encoding formats, for example, moving picture experts group (MPEG) 1, MPEG 2, MPEG 3, and MPEG 4.

Figure 17:
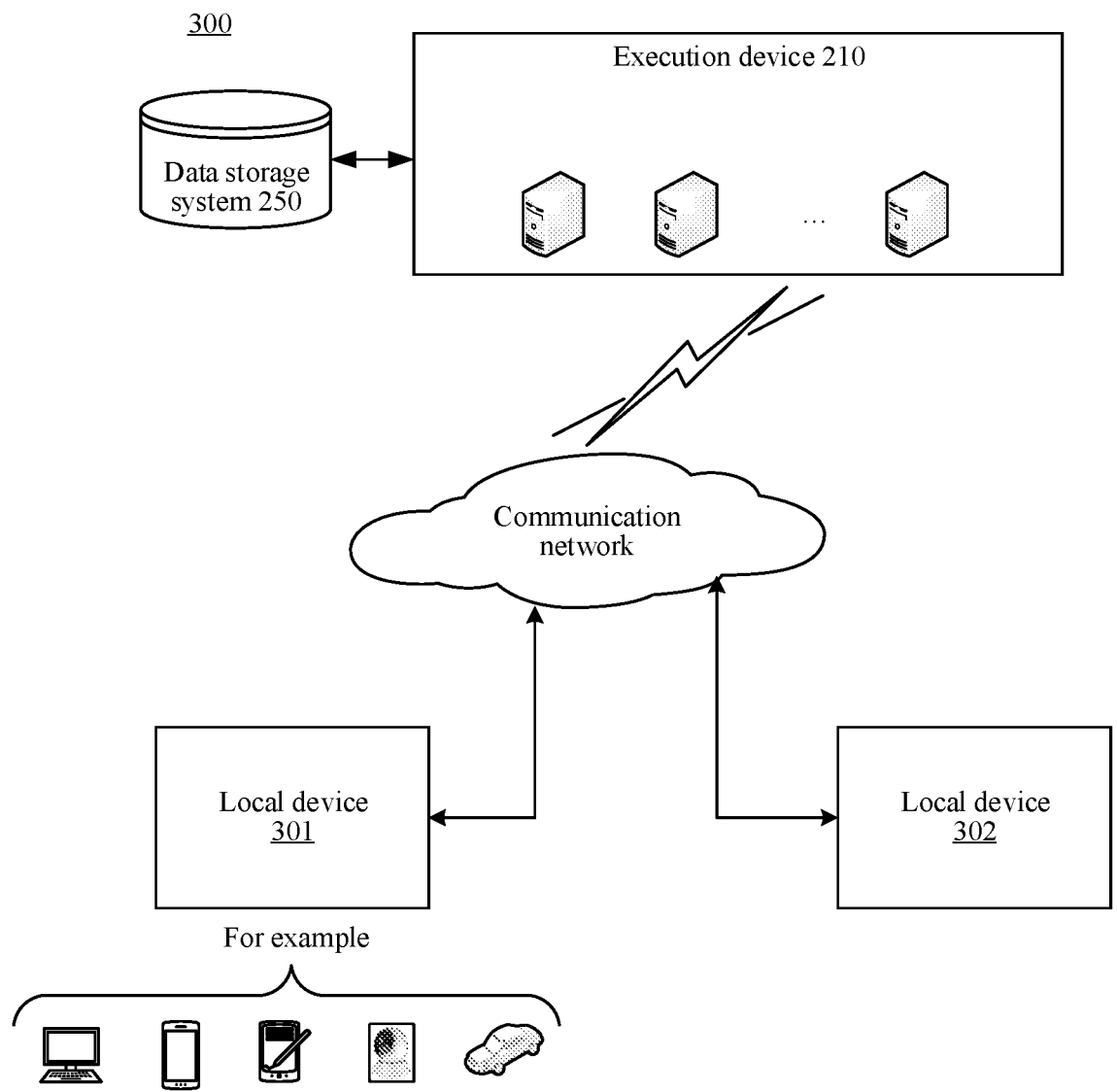
FIG. 17 is a diagram of an architecture of a device-cloud system according to an embodiment of the present application.

Referring to FIG. 17, embodiments of the present application provide a device-cloud system architecture 300. An execution device 210 is implemented by one or more servers. Optionally, the execution device 210 cooperates with another calculation device, for example, a device such as a data storage device, a router, or a load balancer. The execution device 210 may be disposed on one physical site, or distributed on a plurality of physical sites. The execution device 210 may implement the method shown in FIG. 7 by using data in a data storage system 250 or by invoking program code in a data storage system 250.

A user may operate respective user equipment (for example, a local device 301 and a local device 302) to interact with the execution device 210. Each local device may be any calculation device, such as a personal computer, a computer workstation, a smartphone, a tablet computer, an intelligent camera, a smart automobile, another type of cellular phone, a media consumption device, a wearable device, a set-top box, or a game console.

A local device of each user may interact with the execution device 210 through a communication network of any communication mechanism/communication standard. The communication network may be a wide area network, a local area network, a point-to-point connection, or any combination thereof.

In another implementation, one or more aspects of the execution device 210 may be implemented by each local device. For example, the local device 301 may provide local data or feed back a computation result for the execution device 210.

It should be noted that all functions of the execution device 210 may also be implemented by the local device. For example, the local device 301 implements a function of the execution device 210 and provides a service for a user of the local device 301, or provides a service for a user of the local device 302.

It should be understood that terms such as "first" and "second" in this specification is used to achieve simplicity in distinguishing similar concepts, and do not constitute any limitation.

A person skilled in the art may clearly understand that, descriptions of embodiments provided in this application may be mutually referenced. For ease and brevity of description, for example, for functions of the apparatuses and devices and performed steps that are provided in embodiments of the present application, refer to related descriptions in method embodiments of this application. Reference can also be made between various method embodiments and between various apparatus embodiments.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of the present application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner.

In the several embodiments provided in this application, it should be understood that the disclosed apparatus and method may be implemented in other manners. For example, the described embodiments are merely examples. For example, division into the modules or units is merely logical function division and may be other division in actual implementation. For example, a plurality of units or components may be combined or integrated into another system, or some features may be ignored or not performed. The units described as separate parts may or may not be physically separate, and parts displayed as units may or may not be physical units, may be located in one position, or may be distributed on a plurality of network units. Some or all the modules may be selected according to actual needs to achieve the objectives of the solutions of embodiments. A person of ordinary skill in the art may understand and implement embodiments of the present application without creative efforts.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
adding a first conversion operator to a model, wherein the model comprises a plurality of operators running on a plurality of calculation circuits, the plurality of calculations circuits correspond to different data formats, the first conversion operator converts data input into the first conversion operator into a general format, and the general format is a data format supported by all calculation circuits of the plurality of calculation circuits; and
modifying another operator that is in the model, to cause formats of both data input into the another operator and data output from the another operator to be the general format, wherein the another operator is after the first conversion operator in a processing sequence of the model.

2. The method according to claim 1, further comprising:
receiving input data of the model; and
after modifying the another operator, running, by the plurality of calculation circuits, corresponding operators in the model to process input data, to train the model or obtain output data of the model.

3. The method according to claim 2, wherein adding the first conversion operator to the model comprises:
determining, based on the model and the input data of the model, a location in the processing sequence for adding the first conversion operator to the model.

4. The method according to claim 2, further comprising:
after receiving input data of the model, generating a calculation flow graph of the model based on the model and the input data of the model, wherein the calculation flow graph comprises the plurality of operators and a plurality of conversion operators between the plurality of operators;
wherein adding the first conversion operator to the model comprises: replacing an initial conversion operator in the processing sequence of the model with the first conversion operator; and
wherein after modifying the another operator, the method further comprises:
updating the calculation flow graph.

5. The method according to claim 2, further comprising:
adding a second conversion operator before an output end of the model, to cause the output data of the model to have a predetermined format.

6. The method according to claim 1, wherein the plurality of calculation circuits comprise a plurality of calculation circuits in a single processor, or a plurality of calculation circuits in a plurality of processors.

7. The method according to claim 3, wherein the plurality of calculation circuits comprise a plurality of calculation circuits in a neural-network processing unit (NPU) or a plurality of calculation circuits in a graphics processing unit (GPU).

8. The method according to claim 1, wherein the different data formats correspond to different dimensions, and a dimension of the general format is greater than or equal to a maximum dimension in the different dimensions of the different data formats.

9. The method according to claim 1, further comprising:
receiving input data of the model;
determining, based on a calculation circuit corresponding to each operator of the model, the different data formats corresponding to the plurality of calculation circuits; and
determining the general format based on the different data formats corresponding to the plurality of calculation circuits.

10. The method according to claim 1, wherein the plurality of calculation circuits comprise a matrix calculation circuit and a vector calculation circuit that are in a neural-network processing unit (NPU), the general format corresponds to the matrix calculation circuit, and modifying the another operator comprises:
modifying an operator that runs on the vector calculation circuit.

11. An apparatus, comprising:
at least one processor that is configured to run a plurality of calculation circuits, wherein a model comprises a plurality of operators, the plurality of operators run on the plurality of calculation circuits, and the plurality of calculation circuits correspond to different data formats; and
wherein the at least one processor is configured to:
add a first conversion operator to the model, wherein the first conversion operator is configured to convert data input into the first conversion operator into a general format, wherein the general format is supported by all calculation circuits of the plurality of calculation circuits; and
modify another operator that is in the model, to cause formats of both data input into the another operator and data output from the another operator to be the general format, wherein the another operator is after the first conversion operator in a processing sequence of the model.

12. The apparatus according to claim 11, wherein the at least one processor is further configured to:
receive input data of the model; and
after modifying the another operator, invoke the plurality of calculation circuits to respectively run corresponding operators in the model to process the input data, to train the model or obtain output data of the model.

13. The apparatus according to claim 12, wherein the plurality of calculation circuits comprise a plurality of calculation circuits in a single processor, or a plurality of calculation circuits in a plurality of processors.

14. The apparatus according to claim 13, wherein the plurality of calculation circuits comprise a plurality of calculation circuits in a neural-network processing unit (NPU) or a plurality of calculation circuits in a graphics processing unit (GPU).

15. The apparatus according to claim 12, wherein the at least one processor is configured to:
determine, based on the model and the input data of the model, a location for adding the first conversion operator to the model.

16. The apparatus according to claim 12, wherein the at least one processor is further configured to:
after receiving the input data of the model, generate a calculation flow graph of the model based on the model and the input data of the model, wherein the calculation flow graph comprises the plurality of operators and a plurality of conversion operators between the plurality of operators;
wherein adding the first conversion operator to the model comprises replacing an initial conversion operator in the processing sequence of the model with the first conversion operator; and
wherein the at least one processor is further configured to update the calculation flow graph after the modifying the another operator.

17. The apparatus according to claim 12, wherein the at least one processor is further configured to add a second conversion operator before an output end of the model, to cause the output data of the model to have a predetermined format.

18. The apparatus according to claim 11, wherein the different data formats correspond to different dimensions, and a dimension of the general format is greater than or equal to a maximum dimension in the different dimensions of the different data formats.

19. The apparatus according to claim 11, wherein the at least one processor is further configured to:
receive input data of the model;
determine, based on a calculation circuit corresponding to each operator of the model, the different data formats corresponding to the plurality of calculation circuits; and
determine the general format based on the different data formats corresponding to the plurality of calculation circuits.

20. A non-transitory computer-readable storage medium, wherein the non-transitory computer-readable storage medium stores a computer program, and when the computer program is executed in a computer or a processor, the computer or the processor is enabled to perform operations comprising:
adding a first conversion operator to a model, wherein the first conversion operator is configured to convert data input into the first conversion operator into a general format, wherein the general format is supported by all calculation circuits of a plurality of calculation circuits of the model, wherein the model comprises a plurality of operators, the plurality of operators run on the plurality of calculation circuits, and the plurality of calculation circuits correspond to different data formats; and
modify another operator that is in the model, to cause formats of both data input into the another operator and data output from the another operator to be the general format, wherein the another operator is after the first conversion operator in a processing sequence of the model.

* * * * *